(12) United States Patent
Tamai et al.

(10) Patent No.: US 7,642,007 B2
(45) Date of Patent: Jan. 5, 2010

(54) BATTERY PACK AND ITS METHOD OF MANUFACTURE

(75) Inventors: Mikitaka Tamai, Tsuna-gun (JP); Yasushi Inoue, Sumoto (JP); Hiroki Teraoka, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 1412 days.

(21) Appl. No.: 10/180,091

(22) Filed: Jun. 27, 2002

(65) Prior Publication Data
US 2003/0003357 A1 Jan. 2, 2003

(30) Foreign Application Priority Data
Jun. 29, 2001 (JP) ............................. 2001-200192

(51) Int. Cl.
*H01M 2/30* (2006.01)
*H01M 2/08* (2006.01)
(52) U.S. Cl. ...................... 429/181; 429/123; 29/623.2; 29/623.4
(58) Field of Classification Search .................. 429/61, 429/96, 121, 129, 163, 181, 231.95, 232, 429/62, 56, 162, 322, 336, 57, 89, 7, 53, 429/231.1, 185; 29/612, 621, 623.1; 219/541; 439/500; 361/831
See application file for complete search history.

(56) References Cited

U.S. PATENT DOCUMENTS

| | | | | |
|---|---|---|---|---|
| 6,492,058 | B1 * | 12/2002 | Watanabe et al. | 429/121 |
| 2003/0141841 | A1 * | 7/2003 | Kawabata et al. | 320/112 |
| 2004/0091769 | A1 * | 5/2004 | Kawabata et al. | 429/163 |
| 2005/0053827 | A1 * | 3/2005 | Watanabe et al. | 429/61 |

FOREIGN PATENT DOCUMENTS

| | | | |
|---|---|---|---|
| EP | 1032108 A2 * | 8/2000 | |
| JP | 2000-315483 | 11/2000 | |

* cited by examiner

*Primary Examiner*—Robert Hodge
(74) *Attorney, Agent, or Firm*—Wenderoth, Lind & Ponack, L.L.P.

(57) ABSTRACT

The battery pack has a battery, output terminals to bring out the battery electrodes, and a molding holder to connect to the battery as well as retain the output terminals. The battery pack is molded with at least the battery, the molding holder, and its connecting region inserted into a molded plastic resin region. The molded plastic resin region exposes output terminal surfaces, and also joins the battery, output terminals, and molding holder as a single unit.

19 Claims, 8 Drawing Sheets

PRIOR ART

BATTERY PACK AND ITS METHOD OF MANUFACTURE

This application is based on Application No. 200192 filed in Japan on Jun. 29, 2001, the content of which is incorporated hereinto by reference.

BACKGROUND OF THE INVENTION

This invention relates to a method of battery pack manufacture, and in particular to a battery pack and its method of manufacture wherein batteries and output terminals are inserted into a mold in a process step to form an external plastic case.

A battery pack formed by inserting batteries into a molded plastic resin region, which serves as the external battery pack case, has been developed. This type of battery pack is cited in Japanese Non-examined Patent Publication 2000-315483. As shown in FIG. 1, the printed circuit board 105 and batteries 102 are inserted and fixed in the mold when a molded plastic resin region is formed and becomes the external case of the battery pack. Unlike related art battery packs, this battery pack does not require battery and printed circuit board insertion and assembly in a separately formed case. Here, the printed circuit board and batteries are held in fixed positions during the molding step to form the molded plastic resin region which becomes the case. This type of battery pack can be manufactured inexpensively in quantity.

However, when the battery pack shown in FIG. 1 is actually manufactured in quantity, it has the drawback of poor yield. This is because the molded plastic resin region is difficult to form in a precise configuration. In particular, an error in the printed circuit board 105 dimensions makes molding difficult for a battery pack in which the printed circuit board 105 is inserted into the molded plastic resin region. The printed circuit board 105 is inserted and temporarily held in the mold cavity 111 for molding in the plastic resin region. However, a printed circuit board 105 with error in its dimensions cannot be temporarily held in a precise position in the mold 110. This is because the printed circuit board 105 is slid into, or sandwiched in the mold to temporarily hold it in a fixed position in the mold cavity 111. The mold 110 is designed to allow a printed circuit board 105 with maximum dimensions to be slid or sandwiched in the mold cavity 111 and temporarily held. Consequently, a printed circuit board smaller than maximum dimensions cannot be temporarily held in the proper position, and it also cannot be reliably retained in that position. A printed circuit board which cannot be reliably retained in the mold cavity can easily become further out of position when molten plastic resin is injected into the mold cavity. Therefore, this battery pack has the drawback that the inserted printed circuit board moves out of position. In a battery pack having output terminals attached to a printed circuit board, and having those output terminals exposed outside the molded plastic resin region, there is a further drawback of plastic resin attaching to the surfaces of the output terminals. The cross-sectional view of FIG. 2 shows a mold for forming a plastic resin region that exposes the output terminals outside of the molded plastic resin region. As shown in FIG. 2, it is necessary to tightly contact the mold 210 to the output terminals 203 at the exposed areas. If space is left here, plastic resin can ingress into the gap left between the mold 210 and the output terminals 203 as shown by the broken lines of FIG. 2. This will cover the output terminals 203 with plastic resin. In particular, high manufacturing efficiency injection molding injects molten synthetic resin into the mold cavity 211 at extremely high pressures. Therefore, molten plastic resin can ingress into even small gaps and reduce yield. A battery pack with plastic resin on its output terminals does not allow electrical connection of the output terminals to power supply terminals of an electrical apparatus and is a reject part.

As shown in FIG. 1, a connector 116 provided with output terminals at the end of lead wires 115 is attached to a battery pack having parts such as a printed circuit board which cannot be accurately positioned in the mold. In a battery pack of this configuration, output terminals are not embedded within the molded plastic resin region, and yield can be improved. However, not only does the attachment of lead wires 115 make fabrication more complex, temporary placement within the mold 110 is also troublesome. This is because battery pack parts are temporarily placed in the mold cavity 111 with lead wires 115 pulled outside the mold 110. Furthermore, this battery pack has the drawback that lead wires can be easily open circuited. In addition, electrical equipment which attaches a battery pack having lead wires must provide internal the necessary space to accommodate the lead wires and connector. Therefore, it also has the drawback that space for holding the battery pack becomes greater.

The present invention was developed to eliminate drawbacks of the type mentioned above. Thus it is a primary object of the present invention to provide a battery pack and its method of manufacture wherein output terminals can be inserted in a mold and accurately positioned within the plastic resin mold region.

The above and further objects and features of the invention will more fully be apparent from the following detailed description with accompanying drawings.

SUMMARY OF THE INVENTION

The battery pack of the present invention is provided with a battery, output terminals to bring out the electrodes of the battery, and a molding holder to mate with the battery and retain the output terminals. In this battery pack, at least the battery, the molding holder, and its connecting region are inserted into a molded plastic resin region. The molded plastic resin region exposes the output terminal surfaces, and also joins the battery, output terminals, and molding holder as a single unit.

Preferably, output terminals are fixed to a printed circuit board of the battery pack of the present invention, and the molding holder is disposed between this printed circuit board and the battery. The printed circuit board can be disposed parallel to the end plane of the battery. The printed circuit board is connected to positive and negative battery electrodes via lead plates. In this battery pack, the molding holder is sandwiched and held between the printed circuit board and battery, and the printed circuit board, molding holder, and end region of the battery are inserted and molded into the plastic resin region.

The molded plastic resin region preferably comprises end cover segments disposed to enclose both ends of the battery, and connection segments to join the end cover segments at both ends of the battery. Connection segments can be positioned along the corner regions of edges of the external battery case. Further, corner regions of edges of the external battery case can be beveled, and connection segments can be positioned along these beveled-edge corner regions.

The method of manufacture of the present invention fabricates a battery pack provided with a battery, output terminals to bring out the electrodes of the battery, and a molding holder to mate with the battery and retain the output terminals. In this method of manufacture, the molding holder, output terminals, and battery are temporarily retained in a mold, and synthetic resin in the molten state is injected into the mold cavity. Further, in this method of manufacture, at least the connecting region of the battery and molding holder are inserted into the plastic resin region formed by the mold. In addition, the molded plastic resin region is formed to expose the output terminal surfaces from the plastic resin, and to join the battery, output terminals, and molding holder as a single unit.

In the method of manufacture of the present invention, output terminals can be fixed to a printed circuit board, the molding holder can be disposed between this printed circuit board and the battery, and this assembly can be inserted and molded into the plastic resin region. The printed circuit board can be disposed parallel to the end plane of the battery, and it can be connected to positive and negative battery electrodes via lead plates. The molding holder is sandwiched between the printed circuit board and battery and temporarily retained in the mold, molten synthetic resin is injected into the mold cavity, and the printed circuit board, molding holder, and end region of the battery are embedded in the molded plastic resin region.

Further, in the method of manufacture of the present invention, the plastic resin region can be formed by the mold with end cover segments disposed to enclose both ends of the battery, and with connection segments to join the end cover segments at both ends of the battery. Preferably, the molded plastic resin region is formed with connection segments positioned along the corner regions of edges of the external battery case. In this molded plastic resin region, a battery having an external case with beveled-edge corner regions can be temporarily held in the mold cavity, and connection segments can be formed along the beveled-edge corner regions of the external battery case.

The battery pack and its method of manufacture described above has the characteristic that output terminals can be inserted in accurate positions within the molded plastic resin region. This is because the battery pack and method of manufacture of the present invention connects output terminals to the battery via a molding holder formed separately from the molded plastic resin region, and the molded plastic resin region is formed with the molding holder, output terminals, and battery inserted in that region. The molding holder can be molded with extremely high precision compared to components such as the external battery case. Consequently, a configuration joining the output terminals to the battery via the molding holder can embed those components in the molded plastic resin region while disposing the output terminals in an accurate position with respect to the battery. In this manner, the battery pack and method of manufacture of the present invention, which allows output terminals to be inserted in accurate positions in the molded plastic resin region, can effectively prevent ingress of plastic resin between the output terminals and the mold during formation of the molded plastic resin region, and can effectively prevent output terminals surfaces from being covered with plastic allowing yield increase.

DETAILED DESCRIPTION OF THE INVENTION

Figure 1:
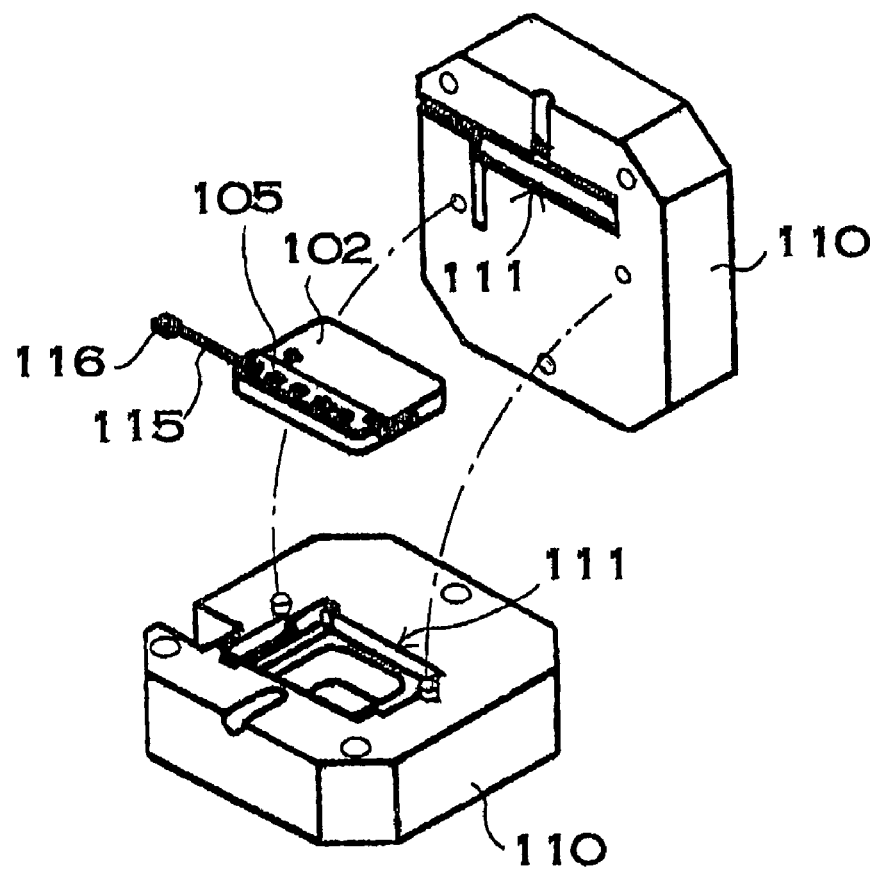
FIG. 1 is a perspective view showing a manufacturing step of a prior art battery pack.
Figure 2:
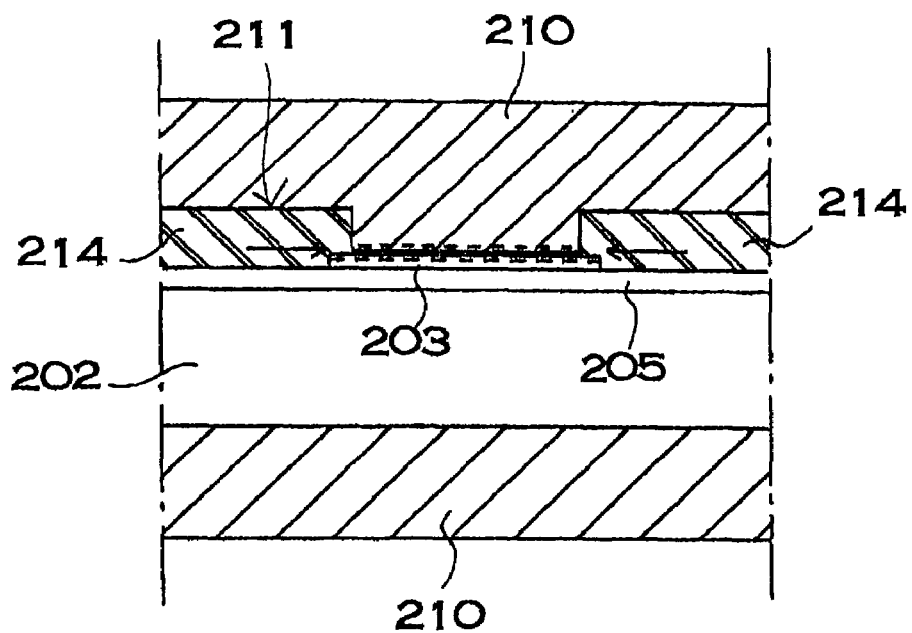
FIG. 2 is a cross-sectional view showing a manufacturing step of a battery pack which exposes output terminals outside its molded plastic resin region.
Figure 3:
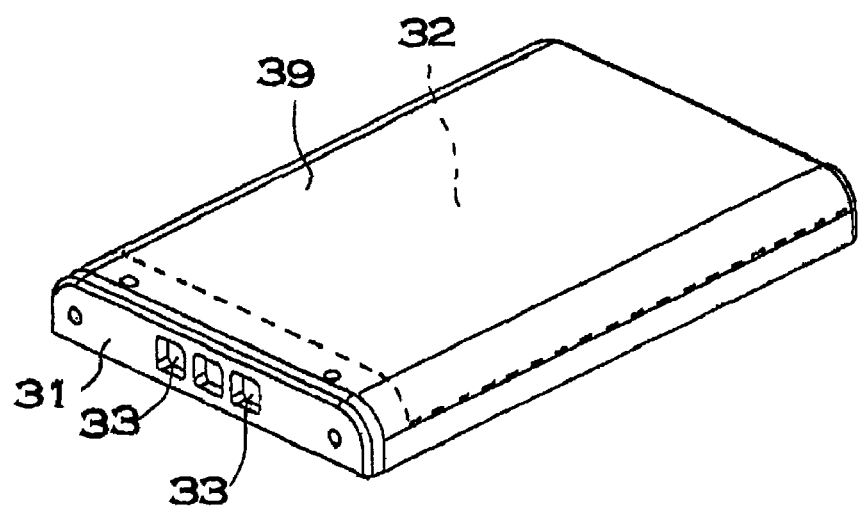
FIG. 3 is a perspective view of a battery pack of an embodiment of the present invention.
Figure 4:
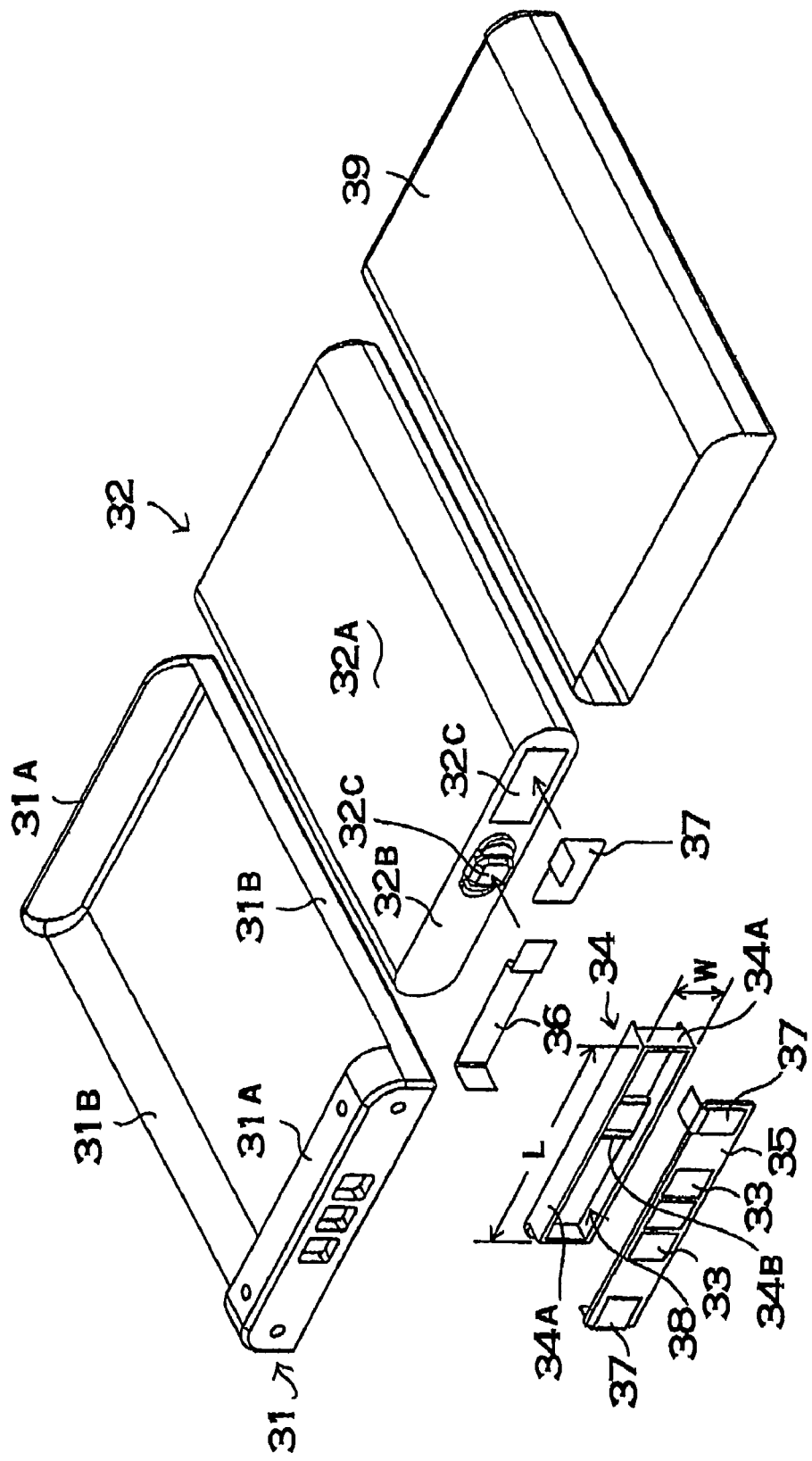
FIG. 4 is an exploded perspective view of the battery pack shown in FIG. 3.
Figure 5:
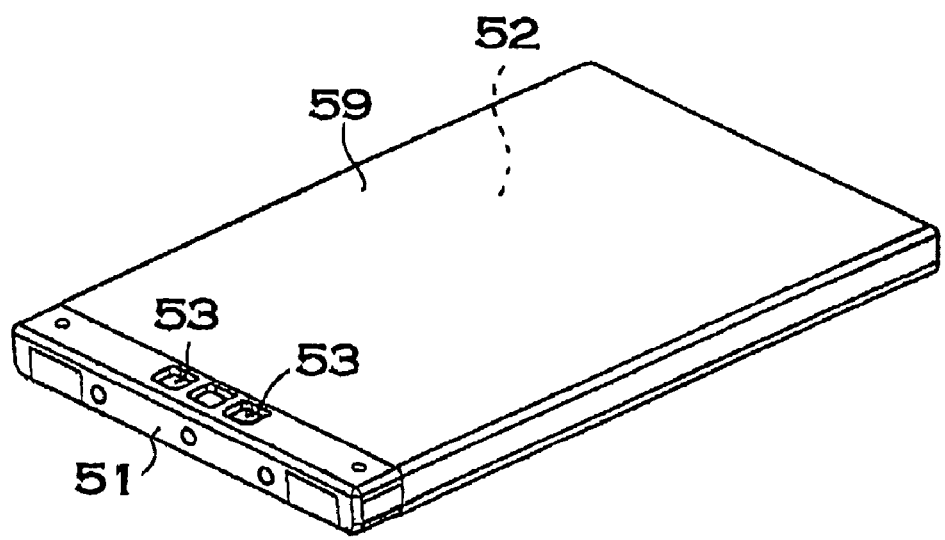
FIG. 5 is a perspective view of a battery pack of another embodiment of the present invention.
Figure 6:
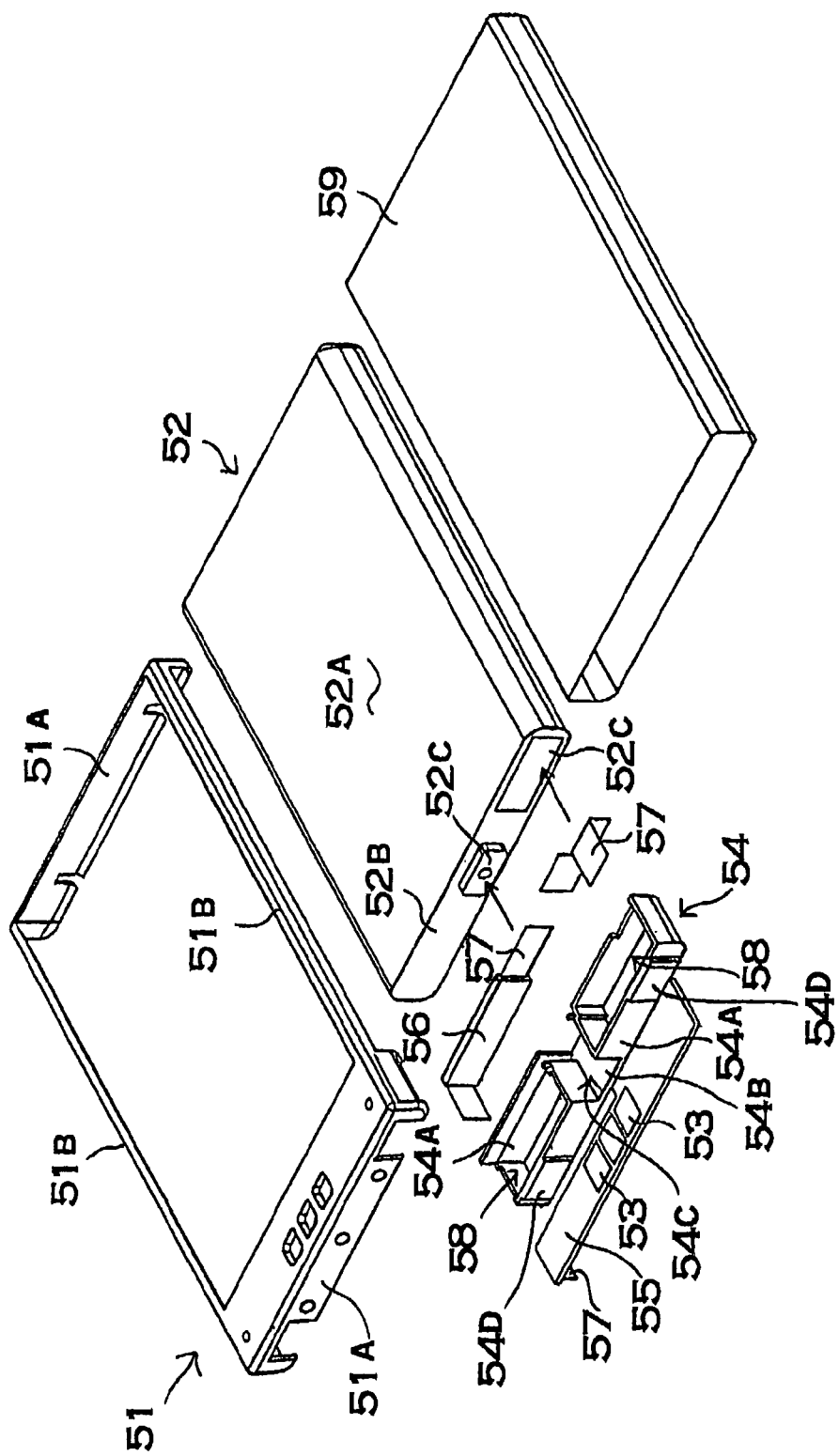
FIG. 6 is an exploded perspective view of the battery pack shown in FIG. 5.

The battery packs shown in FIGS. 3 through 6 have a battery 32,52, molding holder 34,54, and output terminals 33,53 inserted and fixed in a molded plastic resin region 31,51. FIGS. 4 and 6 show oblique views of the disassembled parts of the battery packs of FIGS. 3 and 5. These types of perspective views show the molded plastic resin region 31,51 separated from other parts to allow the form of the molded plastic resin region 31,51 to be easily understood. However, since individual parts are molded into the plastic resin region 31,51 in an actual battery pack, they are not disassembled as shown in the figures. Further, for easy understanding of individual parts embedded in the molded plastic resin region 31,51, these perspective views show the printed circuit board 35,55, molding holder 34,54, PTC device 36,56, and battery 32,52 in separated arrangement. However, when assembled as a battery pack, the printed circuit board 35,55 with attached output terminals 33,53, molding holder 34,54, PTC device 36,56, and battery 32,52 are inserted and fixed in the molded plastic resin region 31,51.

A battery pack, as shown in these figures, is provided with a battery 32,52, a printed circuit board 35,55 with attached output terminals 33,53 which connect to the battery 32,52, and a molding holder 34,54 to hold the output terminals 33,53 in fixed positions via the printed circuit board 35,55.

The battery 32,52 is a rechargeable secondary battery such as a lithium ion battery, a nickel hydrogen battery, or a nickel cadmium battery. Further, the battery 32,52 is a thin outline rectangular battery, both sides of the external case 32A,52A have curved surfaces, and four corner regions of the external case 32A,52A are shaped with beveled-edges. If a lithium ion battery is used as the thin outline rectangular battery, it is characterized by allowing greater charge capacity per overall battery pack volume.

A battery pack of the figures is provided with a molding holder 34,54 to temporarily retain output terminals 33,53 in accurate positions in the mold 310,510 for inclusion in the molded plastic resin region 31,51. The molding holder 34,54 is formed of plastic separately from the molded plastic resin region 31,51. This molding holder 34,54 disposes the output terminals 33,53 in specified positions on the battery 32,52, and is inserted into the molded plastic resin region 31,51. Since the output terminals 33,53 of the battery packs of the figures are attached to a printed circuit board 35,55, the molding holder 34,54 disposes the printed circuit board 35,55 in a specified position on the battery 32,52. In this type of battery pack, output terminals 33,53 are attached to a printed circuit board 35,55, and the output terminals 33,53 are inserted and fixed in position inside the molded plastic resin region 31,51 via the printed circuit board 35,55. Although not illustrated, it is not always necessary to attach the output terminals to a printed circuit board in the battery pack of the present invention. In this battery pack, a molding holder is disposed between the output terminals and the battery, the output terminals, molding holder, and battery are inserted in the molded plastic resin region, and the output terminals are thereby attached in fixed positions.

The printed circuit board 35,55, to which the output terminals 33,53 are attached, also has electronic parts (not illustrated) to provide battery protection circuitry mounted on its surface. The printed circuit board 35,55 of the figures is shorter than the length of the thin outline rectangular battery sealing cap 32B,52B and is narrower than width of the sealing cap 32B,52B. The sealing cap 32B,52B is positioned at the end of the battery 32,52. Consequently, the shape of the end region of the battery 32,52 is the shape of the sealing cap 32B,52B. Output terminals 33,53 are attached to the printed circuit board 35,55 by soldering. Further, the printed circuit board 35,55 is connected to positive and negative electrodes 32C,52C of the battery 32,52 via a PTC device 36,56 and lead plates 37,57. The molding holder 34,54 is sandwiched between the printed circuit board 35,55 and the battery 32,52 and maintains a fixed position until the plastic resin region 31,51 is molded.

The molding holder 34,54 disposes the output terminals 33,53 in fixed positions relative to the battery 32,52 via the printed circuit board 35,55. The molding holder 34,54 also temporarily retains the printed circuit board 35,55, with attached output terminals 33,53, and the battery 32,52 in fixed positions within the mold 310,510. The molding holder 34 of FIG. 4 separates the printed circuit board 35 from one end of the battery 32, and disposes it parallel to end of the battery 32, which is the sealing cap 32B. The molding holder 34 of this figure is formed in an overall rectangular cylindrical shape. The rectangular cylindrical shaped molding holder 34 has perimeter walls 34A disposed perpendicular to the sealing cap 32B, and supports the printed circuit board 35 parallel to the sealing cap 32B. Further, the rectangular cylindrical molding holder 34 has a length (L) and a width (W) equal to the printed circuit board 35 outline, and has a shape that inserts inside the molded plastic resin region 31 in a buried fashion. Still further, the rectangular cylindrical molding holder 34 has a center connecting section 34B formed as a single piece in its rectangular cylindrical center region. The center connecting section 34B is provided with an insertion area (positioned on the backside in FIG. 4) to accommodate the electrode protruding from the sealing lid 32B. This molding holder 34 can be joined to the battery 32 in a specified position by inserting the protruding electrode into the insertion area of the molding holder 34.

Further, the interior of the molding holder 34 in the figures is provided with an open area 38 to accommodate in-flowing plastic with the molding holder 34 in contact with the battery 32 sealing cap 32B. Plastic of the molded plastic resin region 31 is also injected into the interior of this molding holder 34, which allows it to be solidly inserted in the molded plastic resin region 31. However, it is not always necessary to inject plastic of the molded plastic resin region 31 into the interior of the molding holder 34. Still further, the molding holder 34 of the figures is provided with a through-hole (not illustrated) to pass through the lead plate 37 attached to one end of the printed circuit board 35. In this configuration of molding holder 34, the lead plate 37 attached to the printed circuit board 35 is passed through the through-hole allowing the printed circuit board 35 to be connected in a fixed position.

This configuration of molding holder 34 is sandwiched between the printed circuit board 35 and the battery 32 disposing the printed circuit board 35 in a fixed position with respect to the battery 32. With the molding holder 34 sandwiched between the printed circuit board 35 and the battery 32, the printed circuit board 35 is connected to the positive and negative battery 32 electrodes 32C via the PTC device 36 and lead plates 37. When the printed circuit board 35 is connected via the PTC device 36 and lead plates 37, the molding holder 34 sandwiched between the printed circuit board 35 and the battery 32 is held in a fixed position. In addition, the printed circuit board 35 can also be bonded to the sandwiched molding holder 34 for even more solid attachment.

The molding holder 54 of FIG. 6 disposes the output terminals 53 perpendicular to the end plane of the battery 52, which is the sealing cap 52B. This molding holder 54 is also formed in a rectangular cylindrical shape and supports the printed circuit board 55. However, this molding holder 54 has its rectangular cylindrical shaped perimeter walls 54A disposed parallel to the sealing cap 52B. This molding holder 54 is shaped as two rectangular sections joined in a parallel fashion by a center connecting section 54B. The center connecting section 54B is positioned between the two rectangular sections and is provided with an insertion area 54C above the center connecting section 54B to accommodate the electrode protruding from the sealing cap 52B. The perimeter wall 54A of the rectangular cylindrical molding holder 54 which faces the sealing cap 52B is increased in height to prevent the printed circuit board 55 from moving out of position. The width (W) of this molding holder 54 is determined by the height of the perimeter wall 54A.

This molding holder 54 also disposes the printed circuit board 55 in a fixed position with respect to the battery 52. When the printed circuit board 55 is connected to the positive and negative electrodes 52C of the battery 52 via the PTC device 56 and lead plates 57, the printed circuit board 55 holds the molding holder 54 in a fixed position. The molding holder 54 is inserted into the molded plastic resin region 51 and attached in a fixed position. Consequently, it is sufficient for the printed circuit board 55 to temporarily hold the molding holder 54 in a fixed position until the molded plastic resin region 51 is formed. However, the printed circuit board 55 may also be attached to the molding holder 54 by bonding.

The output terminals 33,53, molding holder 34,54, and battery 32,52 are inserted into the molded plastic resin region 31,51 at a processing step which molds synthetic plastic resin. Output terminals 33,53 are attached to the printed circuit board 35,55. Therefore, the output terminals 33,53 as well as the printed circuit board 35,55 are inserted in the molded plastic resin region 31,51. The battery pack of the figures does not embed the entire battery 32,52 inside the molded plastic resin region 31,51. The battery 32,52 is inserted in the molded plastic resin region 31,51 with its protruding electrode end plane tightly sealed in the molded plastic resin region 31,51. This type of battery pack is characterized by allowing a smaller outline. However, the battery can also be inserted in the molded plastic resin region with one part, or the entire battery embedded in plastic to make a battery pack with a good sturdy structure.

The molded plastic resin region 31,51 of FIGS. 4 and 6 is formed overall as a single piece and is made up of end cover segments 31A, 51A positioned to cover both ends of the battery 32,52, and connection segments 31B,51B to join a pair of end cover segments 31A,51A. The end cover segment 31A,51A at the protruding electrode end of the battery 32,52, namely the sealing cap 32B,52B end, is formed with the printed circuit board 35,55, the molding holder 34,54, and the end of the battery 32,52 inserted and embedded in molded plastic. The end cover segment 31A,51A at the bottom end of the external case 32B,52B is formed to follow the outer perimeter of the bottom end plane of the battery pack in FIGS. 3 and 4. The end cover segment 31A,51A at the bottom end of the external case 32B,52B of the battery pack in FIGS. 5 and 6 is formed to cover the entire surface of the end plane, namely it is formed in the shape of the bottom end plane.

Figure 7:
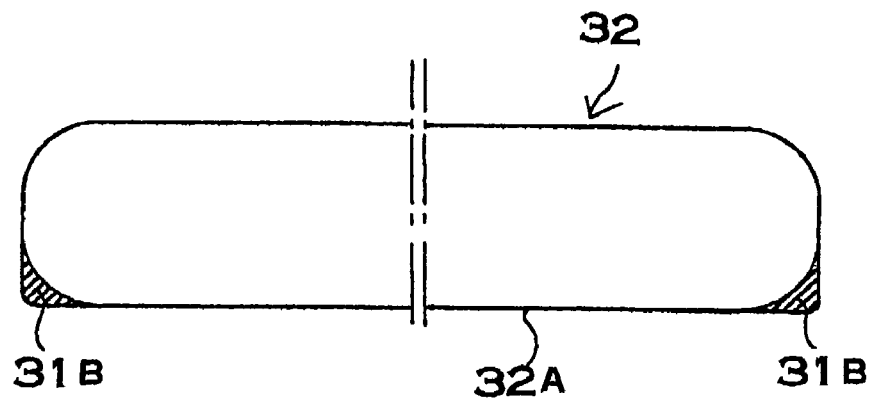
FIG. 7 is a lateral cross-sectional view showing molded plastic resin region connection segments of the battery pack shown in FIG. 3.
Figure 8:
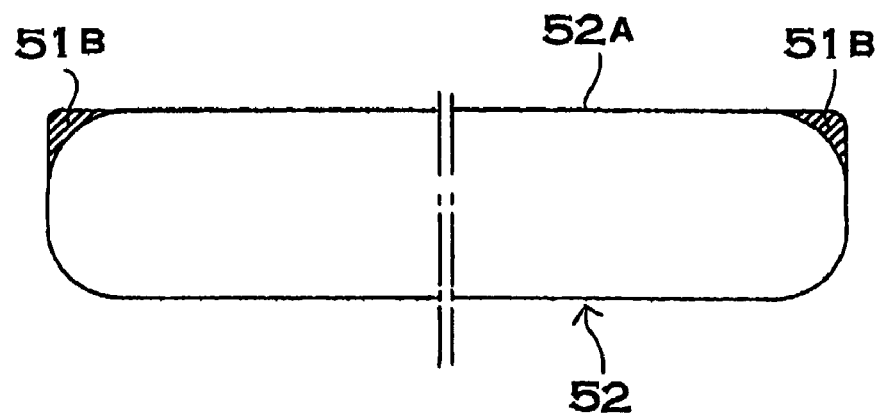
FIG. 8 is a lateral cross-sectional view showing molded plastic resin region connection segments of the battery pack shown in FIG. 5.

Connection segments 31B,51B are positioned along the corner regions of the external case 32A,52A of the battery 32,52. The battery 32,52 of FIGS. 4 and 6 is a thin outline rectangular battery with an external case 32A,52A having beveled-edge corner regions. Connection segments 31B,51B are disposed in the beveled-edge corner regions. As shown in FIG. 7, the battery pack of FIG. 3 has connection segments 31B,51B disposed in corner regions on the lower side (in the figures) of the external case 32A,52A. As shown in FIG. 8, the battery pack of FIG. 5 has connection segments 31B,51B disposed in corner regions on the upper side of the external case 32A,52A. The connection segments 31B,51B are disposed in the beveled-edge corner regions of the external case 32A,52A, and do not increase the size of the battery pack outline. In these figures, the molded plastic resin region 31,51 has two connection segments 31B,51B joining a pair of end cover segments 31A,51A. However, it is also possible to establish connection segments along four corner regions of the external case to join a pair of end cover segments with four connection segments.

The battery packs described above are manufactured as follows.

(1) Output terminals 33,53 and protection circuit electronic components (not illustrated) are attached to the printed circuit board 35,55.

(2) The printed circuit board 35,55 is connected to the battery 32,52 via lead plates 37,57 and the PTC device 36,56. The PTC device 36,56 is disposed between the molding holder 34,54 and the battery 32,52. The PTC device 36,56 and lead plates 37,57 are spot welded and connected at one end to the battery 32,52, and are spot welded and connected at the other end to lead plates 37,57 attached to the printed circuit board 35,55. When the printed circuit board 35,55 is connected to the battery 32,52, the molding holder 34,54 is disposed between the printed circuit board 35,55 and the battery 32,52. The molding holder 34,54 is located between the printed circuit board 35,55 and the battery 32,52, and connects the printed circuit board 35,55 and the battery in precise relative positions.

By the above processing steps, the printed circuit board 35,55, molding holder 34,54, and battery 32,52 are connected as a unit to become a battery assembly.

(3) After the battery assembly is set in the mold cavity, the mold is fastened together. As shown in FIGS. 9 through 12, the fastened together mold 310,510 has gaps 312,512 to form the molded plastic resin region 31,51. Heated, molten synthetic plastic resin is injected into these gaps 312,512 to form the molded plastic resin region 31,51. The molten synthetic resin is injected through a plastic injection orifice 310A,510A opened through the mold 310,510. The plastic injection orifice 310A,510A is in communication with the gaps 312,512 in the mold cavity 311,511. Further, the mold 310,510 has alignment projections 313,513 to temporarily retain the battery assembly in a fixed position. The alignment projections 313,513 contact the surfaces of the molding holder 34,54 or the printed circuit board 35,55 and temporarily hold the battery assembly in a precise position.

Figure 9:
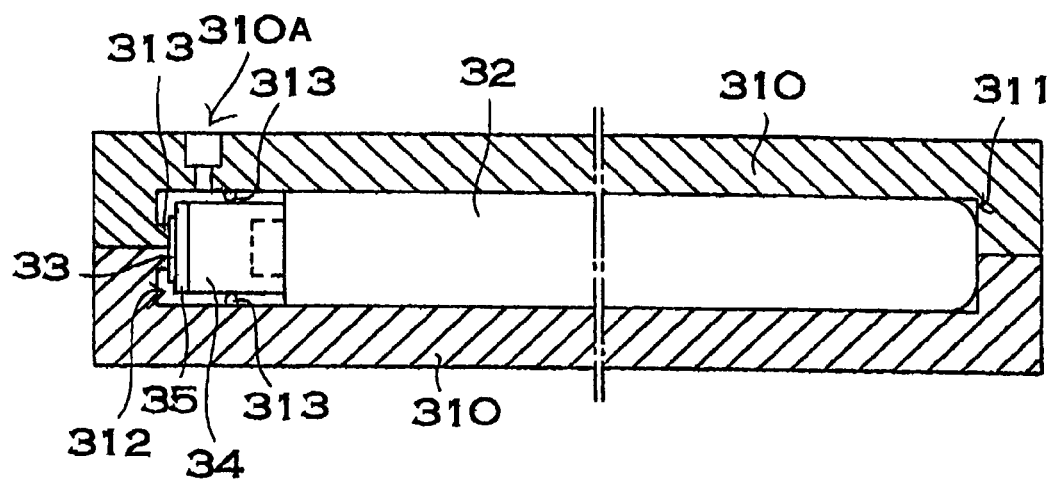
FIG. 9 is a lengthwise cross-sectional view showing the mold for forming the plastic resin region of the battery pack shown in FIG. 3.
Figure 10:
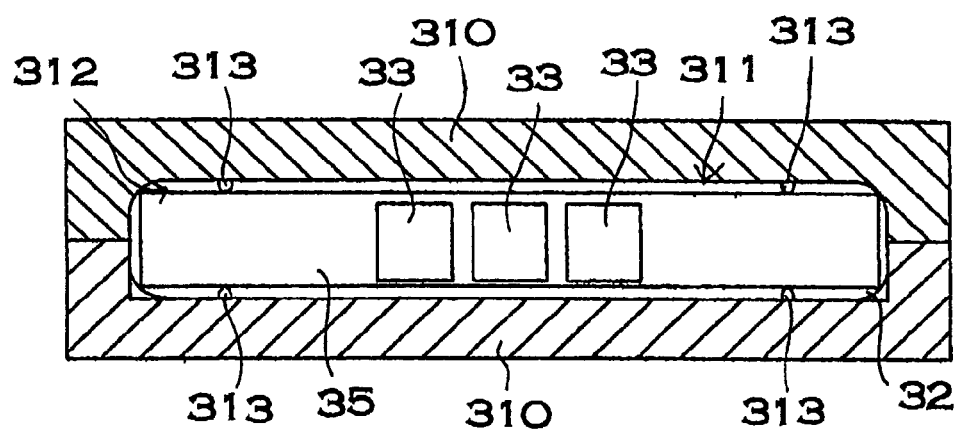
FIG. 10 is a lateral cross-sectional view showing the mold for forming the plastic resin region of the battery pack shown in FIG. 3.

FIGS. 9 and 10 show cross-sectional views of the mold 310 for fabrication of the battery pack of FIG. 3. These and other figures show mold 310 alignment projections 313 pressing against molding holder 34 surfaces to temporarily retain the assembly in a fixed position. The alignment projections 313 of these figures sandwich the molding holder 34 from above and below and prevent vertical movement out of position. Further, as shown in FIG. 10, square upper corners of the molding holder 34 contact mold 310 corner region inside surfaces to prevent lateral movement out of position. Finally, for the mold 310, alignment projections 313 press against the surfaces of the output terminals 33, and the bottom end of the battery 32 contacts the inside surface of the mold 310 cavity 311 to prevent lengthwise movement of the battery assembly out of position.

Figure 11:
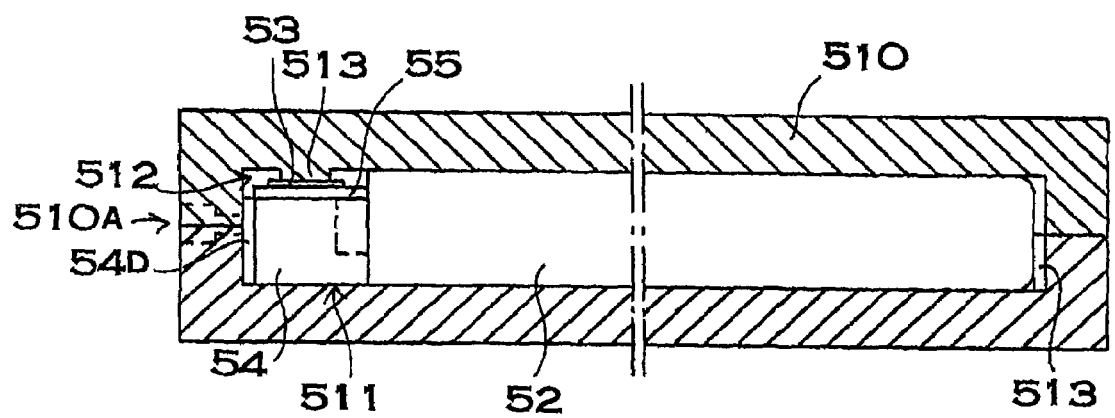
FIG. 11 is a lengthwise cross-sectional view showing the mold for forming the plastic resin region of the battery pack shown in FIG. 5.
Figure 12:
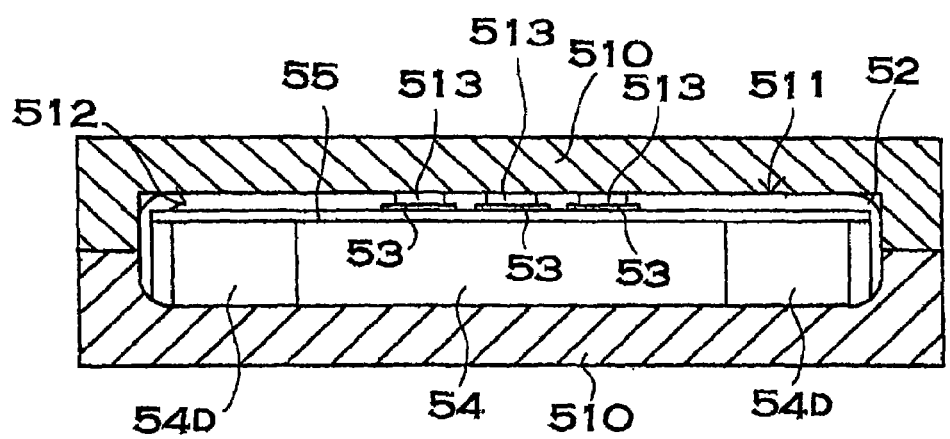
FIG. 12 is a lateral cross-sectional view showing the mold for forming the plastic resin region of the battery pack shown in FIG. 5.

FIGS. 11 and 12 show cross-sectional views of the mold 510 for fabrication of the battery pack of FIG. 5. These and other figures show mold 510 alignment projections 513 pressing against the surfaces of the output terminals 53 to temporarily retain the printed circuit board 55 and molding holder 54 in a fixed position. For the mold 510 of these figures, alignment projections 513 press against the surfaces of the output terminals 53, and the bottom surface of the molding holder 54 contacts the inside surface of the mold 510 cavity 511 to prevent vertical movement of the printed circuit board 55 and the molding holder 54 out of position. Further, as shown in FIG. 12, square lower corner regions of the molding holder 54 are shaped to fit along inside surfaces of mold 510 corner regions to prevent lateral movement out of position. Alignment projections 513 pressing against the upper surface of the printed circuit board 55 press against the surfaces of the output terminals 53 and expose those output terminals 53 outside the molded plastic resin region 51. Finally, for the mold 510 in FIG. 11, projections 54D from the front surfaces of the molding holder 54 contact the inside surface of the mold 510 cavity 511, and mold 510 alignment projections 513 press against the bottom end of the battery 52 to prevent lengthwise movement of the battery assembly out of position.

(4) Heated, molten synthetic plastic resin is injected under pressure into the mold cavity 311,511. Molten synthetic resin obtains ingress to gaps 312,512 in the mold cavity 311,511 and the molded plastic resin region 31,51 is formed. The plastic resin region 31,51 is molded as a single piece in the form of end cover segments 31A,51A joined by connection segments 31B,51B. The printed circuit board 35,55, molding holder 34,54, and battery 32,52 are inserted in, and fixed in position by the end cover segment 31A,51A at one end. The end cover segment 31A,51A, with the molding holder 34,54 inserted and fixed in it, preferably obtains ingress to the interior of the rectangular cylindrical molding holder 34,54 to solidly hold that molding holder 34,54. To facilitate injection of end cover segment 31A,51A synthetic resin into the interior of the molding holder 34,54, open areas 38,58 are provided to guide molten synthetic resin inside the molding holder 34,54. However, it is not always necessary to cause the ingress of molten synthetic resin to the interior of the molding holder 34,54. The mold 310,510 of FIGS. 9 and 11 forms end cover segments 31A,51A in the same plane as both ends of the battery 32,52. A battery pack fabricated by forming a molded plastic resin region 31,51 with the mold 310,510 can be made with an overall thickness as thin as the battery 32,52. However, the mold can also form a molded plastic resin region with the battery buried in plastic. This type of mold temporarily retains the battery in position with alignment projections to form the molded plastic resin region.

(5) By the processing steps above, the battery assembly, comprising output terminals 33,53, printed circuit board 35,55, molding holder 34,54, and the battery 32,52, is inserted in a fixed position and held within the molded plastic resin region 31,51. Finally, the surface of the battery assembly is covered with tubing 39,59 to produce a completed battery pack. Heat-shrink tubing is used as the tubing 39,59. After insertion of the battery assembly, the heat-shrink tubing is heated and shrunk to tightly cover the surface of the battery assembly.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A battery pack comprising:
   (a) an elongated battery having a length and defining a first end plane, said battery having positive and negative electrodes at the first end plane of the battery such that the positive and negative electrodes are disposed on the same side of the battery;
   (b) output terminals which are directly or indirectly connected to the battery electrodes;
   (c) a molding holder which is positioned so as to oppose the end plane of the battery and also to retain the output terminals;
   (d) at least two leads positioned between the first end plane of the battery and the molding holder, each of the leads being shorter than the length of the battery and connecting one of the output terminals with one of the positive and negative electrodes and another of the output terminals with the other of the negative and positive electrodes, both of the leads are located on the same side of the first end plane; and
   (e) a molded plastic resin region in which is inserted the battery and the molding holder such that the surfaces of the output terminals are exposed to the outside, and the battery, the output terminals, and the molding holder are fixed and joined together as a single unit during molding of the molded plastic resin region, wherein the width of the battery pack is substantially equal to the width of the elongated battery.

2. A battery pack as recited in claim 1 wherein the output terminals are attached to a printed circuit board, and the molding holder is disposed between the printed circuit board and the battery.

3. A battery pack as recited in claim 2 wherein the printed circuit board is disposed parallel to the first end plane of the battery, the printed circuit board is connected to the positive and negative electrodes of the battery via the leads, the molding holder is sandwiched and held between the printed circuit board and the battery, and the printed circuit board, the molding holder, and the end region of the battery are inserted in the molded plastic resin region.

4. A battery pack as recited in claim 2 wherein the battery is a thin outline rectangular battery that includes an external case and a sealing cap, the printed circuit board is positioned in parallel to the sealing cap and is shorter than the length of the rectangular battery sealing cap, and the printed circuit board is narrower than the width of the sealing cap.

5. A battery pack as recited in claim 2 wherein the printed circuit board is connected to the positive and negative electrodes of the battery via a Positive Temperature Coefficient (PTC) device and lead plates.

6. A battery pack as recited in claim 4 wherein the molding holder separates the printed circuit board from one end of the battery and is disposed parallel to the end plane of the battery, which is the sealing cap.

7. A battery pack as recited in claim 6 wherein the molding holder has perimeter walls, the perimeter walls are disposed perpendicular to the sealing cap, and the printed circuit board is supported parallel to the sealing cap.

8. A battery pack as recited in claim 2 wherein the molding holder has a width (W) and a length (L) that is equivalent to the outline of the printed circuit board, and the molding holder has a shape that permits it to be buried in plastic when inserted in the molded plastic resin region.

9. A battery pack as recited in claim 7 wherein the molding holder is formed in a rectangular shape and has a center connecting section formed as a single piece at a center region thereof.

10. A battery pack as recited in claim 9 wherein the sealing cap has an electrode protruding from the sealing cap and the center connecting section has an insertion area accommodating the electrode protruding from the sealing cap of the battery.

11. A battery pack as recited in claim 7 wherein the perimeter walls of the molding holder define an interior space into which plastic of the molded plastic resin region is disposed.

12. A battery pack as recited in claim 3 wherein the molding holder is provided with a through-hole passing through a lead plate attached to one end of the printed circuit board.

13. A battery pack as recited in claim 1 wherein the end plane of the battery, which includes the positive and negative electrodes, is embedded within the molded plastic resin region so as to be tightly sealed therein, and the entire battery is not inserted in the molded plastic resin region.

14. A battery pack as recited in claim 1 wherein the molded plastic resin region is made up of end cover segments positioned to cover both ends of the battery and connection segments to join the end cover segments disposed at both ends of the battery, and wherein the connection segments are positioned along corner regions of the external case of the battery.

15. A battery pack as recited in claim 14 wherein the external case of the battery has beveled-edge corner regions, and the connection segments are positioned along those beveled-edge corner regions.

16. A battery pack as recited in claim 14 wherein the end cover segment positioned at the electrode end of the battery has the printed circuit board, the molding holder, and the end of the battery inserted in it in a buried fashion.

17. A battery pack as recited in claim 14 wherein the end cover segment positioned at the bottom end of the external case is formed in a shape conforming to the outer perimeter of the bottom surface of the battery.

18. A battery pack as recited in claim 14 wherein the end cover segment positioned at the bottom end of the external case covers the entire bottom surface of the battery.

19. A battery pack comprising:
   an elongated battery having a length, a width, and a thickness, the battery having first and second end planes each defined by the width and thickness of the battery, and first and second sides defined by the length and width of the battery, wherein the battery has positive and negative electrodes at the first end plane of the battery;

first and second output terminals connected to the positive and negative battery electrodes, respectively;

a molding holder positioned so as to oppose the first end plane of the battery and to retain the first and second output terminals:

a first lead connecting the positive electrode with the first output terminal; and a second lead connecting the negative electrode with the second output terminal, wherein the first and second leads are disposed on one side of the first end plane of the battery, and each of the leads is shorter than the length of the battery, wherein the battery, the output terminals, and the molding holder are integrated as a single unit by a molded plastic resin material formed during a molding operation, wherein the first end plane of the battery is embedded within the molded plastic resin region so as to be tightly sealed therein; and a printed circuit board disposed parallel to the first end plane of the battery, the printed circuit board being separated from the first end plane by the molding holder.

* * * * *